July 21, 1936.  D. M. HUME  2,048,124
DEVICE FOR DEPOSITING MEASURED QUANTITIES OF MATERIAL IN CONTAINERS
Filed May 23, 1934  3 Sheets-Sheet 1
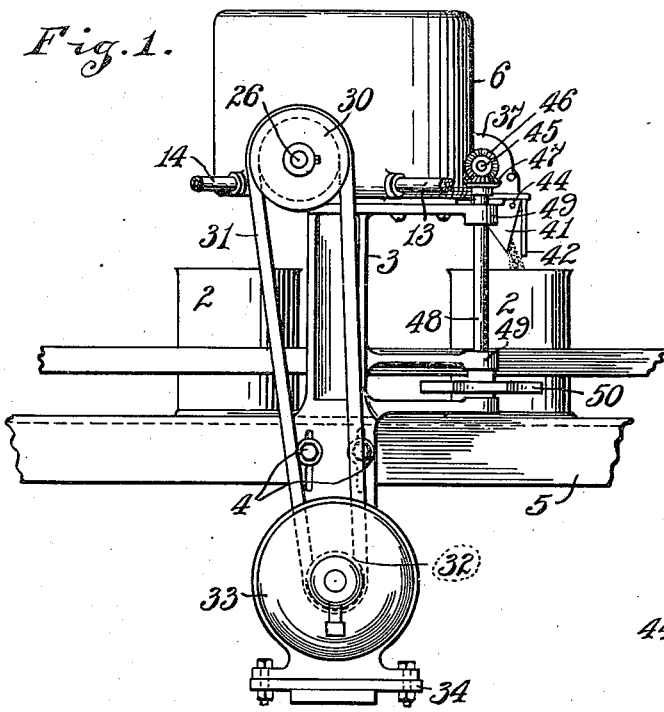
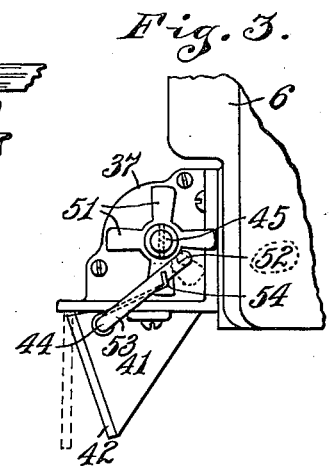
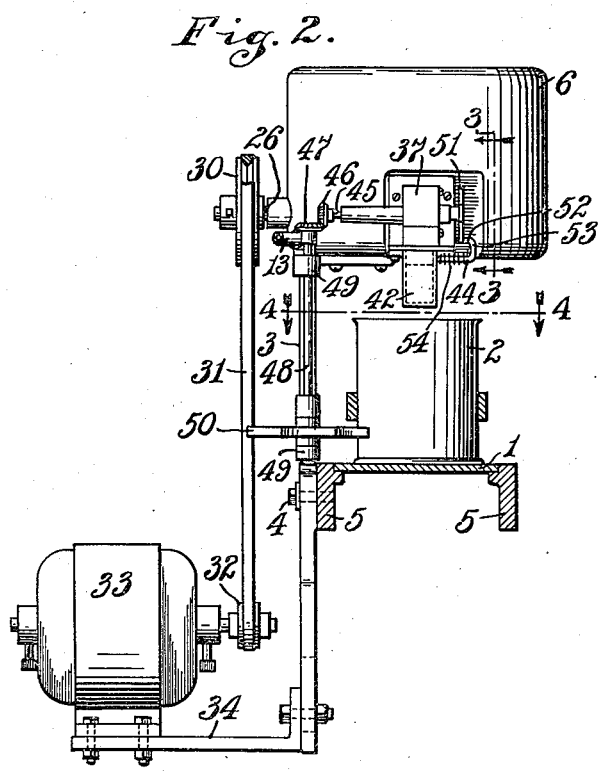
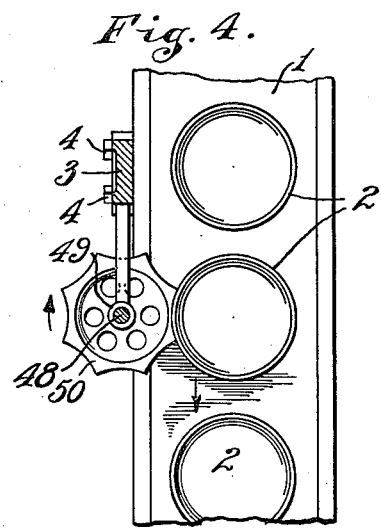
INVENTOR.
Damon M. Hume,
BY
Hood + Hahn
ATTORNEYS

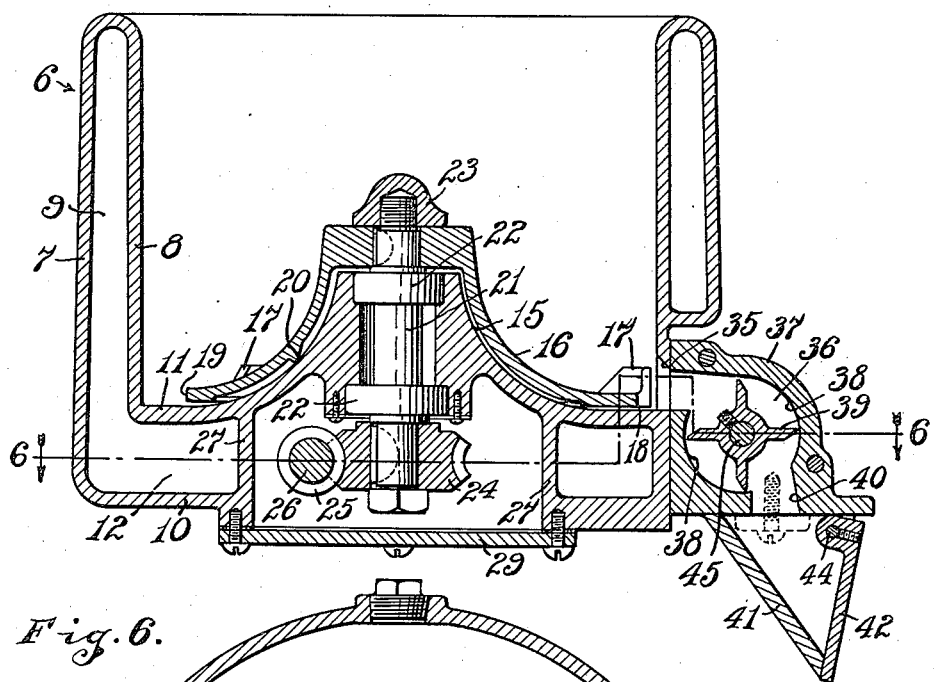
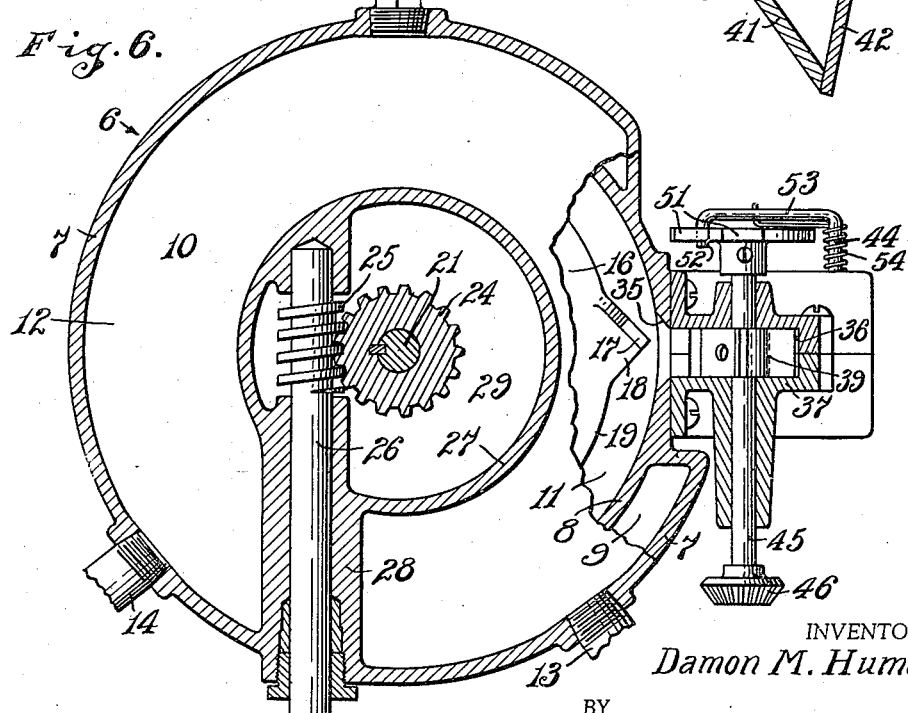

Patented July 21, 1936

2,048,124

UNITED STATES PATENT OFFICE 2,048,124

DEVICE FOR DEPOSITING MEASURED QUANTITIES OF MATERIAL IN CONTAINERS

Damon Marcel Hume, Redkey, Ind.

Application May 23, 1934, Serial No. 727,086

10 Claims. (Cl. 226—72)

My invention relates to improvements in means for depositing granulated material in measured quantities into receptacles as they successively pass a given point.

One of the objects of my invention is to provide means whereby the material which is adapted to be contained in a suitable hopper may be maintained in its dry state in order to insure proper feeding of the same and to provide means for agitating the material, which agitation means requires a minimum of power to operate and which will cause the flow of the material into the measuring apparatus.

Another object of my invention is to provide a measuring apparatus which will definitely and accurately deliver a measured quantity of the material, received from the hopper, into the container which is moved into position to receive the material.

Further objects and advantages of my invention will appear more fully hereinafter.

For the purpose of disclosing my invention I have disclosed one embodiment thereof in the accompanying drawings, in which Fig. 1 is a side elevation of an apparatus embodying my invention;

Fig. 2 is an end elevation thereof;

Fig. 3 is a sectional view taken on the line 3—3 of Fig. 2;

Fig. 4 is a sectional view taken on the line 4—4 of Fig. 2;

Fig. 5 is a transverse sectional view of the hopper and measuring apparatus embodying my invention;

Fig. 6 is a horizontal sectional view taken on the line 6—6 of Fig. 5;

Figure 7:
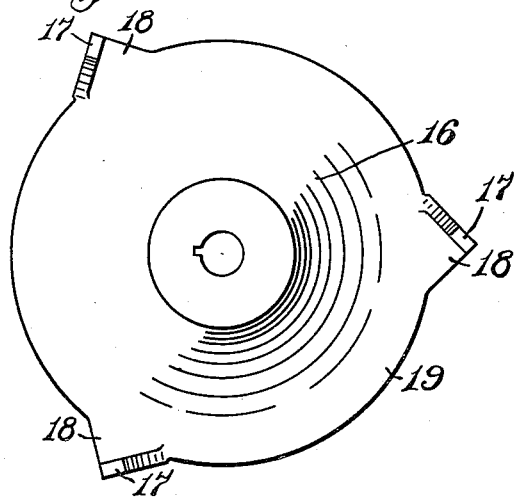
Fig. 7 is a plan view of the agitator used in connection with my apparatus.
Figure 8:
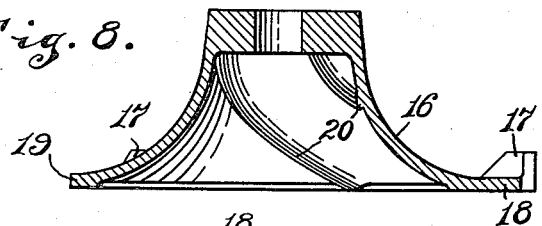
Fig. 8 is a longitudinal sectional view thereof.
Figure 9:
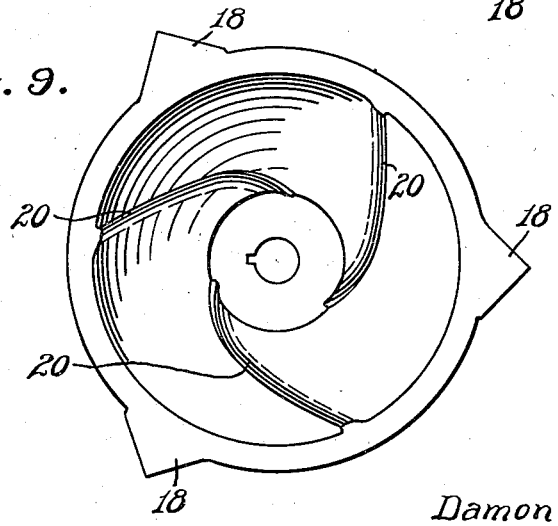
Fig. 9 is a bottom plan of the agitator.

One of the particular uses to which my invention is advantageously adapted is that of depositing a measured quantity of salt into cans and although the apparatus hereinafter described is adapted primarily for this purpose it is quite obvious that this apparatus may be used for handling various types of material and depositing the same in various containers.

In the embodiment of the invention illustrated the measuring device is adapted to be suspended over a conveyer 1 which may be of the belt type and which is adapted to move the cans 2 past or beneath the measuring device in succession. To this end I provide a bracket 3 which is adapted to be secured by suitable bolts 4 to one side 5 of the conveyer. This bracket provides a support for a hopper 6 which is adapted to receive the material. The hopper is preferably formed of a single casting having an outer wall 7 and an inner wall 8 to provide a heating chamber 9 between the same. This same casting is also provided with a bottom 10 and an inner bottom 11 between which is formed the bottom heating chamber 12. In actual construction the chambers 9 and 12 constitute a single chamber into which steam or other heating medium is adapted to be passed by an inlet pipe 13 while the exhaust steam escapes from the chamber from the outlet pipe 14, which pipes communicate with the bottom chamber 12. By this arrangement the entire mass of material contained in the hopper is heated so as to maintain the same in a dry state and this is particularly advantageous in handling such materials as salt which have great affinity for moisture and which when moist tend to cake or pack.

The inner bottom 11 is preferably cone shaped as at 15 and has fitted thereover the agitator. This agitator is preferably in the form of a hollow truncated cone having the side walls 16 thereof concaved and provided at suitable intervals around the periphery thereof with vanes 17 which it will be noted extend at an angle to the circumferential movement of the agitator and are formed on the forward edges of projecting portions 18 of the periphery 19 of the agitator.

There is a tendency, in view of the fact that the agitator is slightly spaced apart from the bottom wall 11 for the salt or other material to creep up underneath the agitator and pack. In order to avoid this the inner wall of the agitator is provided with a series of spirally disposed fins 20 extending from the top to practically the periphery of the agitator and which tend to force any of the material collecting beneath the agitator outwardly towards the periphery thereof.

The agitator is keyed or otherwise secured to a vertically extending operating shaft 21 suitably mounted in ball bearings 22 in an opening extending through the cone shaped portion 15 of the bottom and the agitator is maintained against vertical displacement by a suitable nut 23 which screws on the top of the shaft 21. This shaft 21 at its bottom has secured thereon a worm gear 24 meshing with a worm pinion 25 on the side of the driving shaft 26. The worm drive thus formed operates within a chamber formed in the bottom of the hopper by suitable ribs 27 and a shaft 26 extends to the periphery of the hopper through a suitable bearing 28. The chamber in which the worm drive operates is closed in its bottom by a closure member 29 and thus provides a closed chamber which may be filled with suitable lubricant for properly lubricating the parts. The shaft 26 is provided at its outer end with a driving pulley 30 having a drive belt connection 31 with a driving pulley 32 on the shaft of a motor 33. This motor is preferably bolted to a platform 34 in turn secured to the bottom end of the bracket 3.

The hopper is provided with a discharge opening 35 in its side, the bottom wall of which opening is coincident with the bottom of the hopper and this opening discharges into a measuring chamber 36, preferably formed in a suitable casting 37 bolted or otherwise secured to the side of the hopper. The walls of this measuring chamber 36 are cylindrical as at 38 and operating within the chamber is a suitable star knife 39, the blades of which move in close proximity to the walls 38 of the chamber. It is to be noted that the discharge opening and inlet end of the chamber are considerably above the axis of the star knife and that the discharge opening 40 of the measuring chamber is at right angles to the inlet opening and therefore extends downwardly.

A discharge chute 41 extending from the bottom of the measuring chamber receives the measured quantity of the material from the discharge opening 40 of the measuring chamber and this chute is adapted to deliver the measured material from its side into the container. The discharge opening in the chute is normally closed by a door 42 which is mounted on and moves with a rotatable shaft 44.

The measuring device or star knife is rotated and the door 42 opened coincidently with the passage beneath the chute of the container to receive the charge of the material. To this end the star knife is secured to a shaft 45, the outer end of which is provided with a beveled pinion 46 adapted to mesh with a beveled pinion 47 mounted on a vertical shaft 48 supported in journals or bearings 49 extending from the bracket 3 and provided at its lower end with a star wheel 50 adapted to be engaged and rotated by the successive containers as they pass the same. The opposite end of the shaft 45 is provided with a trip wheel, the arms 51 of which are adapted to engage, as they are rotated, with an inturned lug 52 on an arm 53 extending transversely from the shaft 44 of the door 42 whereby as a charge of material is measured by the star knife 39 the door 42 will be opened to deliver this charge into the receptacle passing beneath the chute. Normally the door is maintained closed by means of a coiled spring 54, one end of which is adapted to engage the arm 53 and the other end of which is adapted to engage against a portion of the casting of the measuring chamber.

The operation of the device is extremely simple. The agitator 16 is continuously rotated by the motor 33 thereby keeping the material in the hopper in a constant state of agitation and through the vanes 17 tending to constantly force the material through the opening 35 into the measuring chamber 36. As a can moves forward on the conveyer 1 it engages the star wheel 50 thereby rotating the star knife 39 which cuts off a measured quantity of material in the measuring chamber and delivers the same into the chute 41. At the same time an arm 51 engages the arm 52 and opens the door 42 permitting said measured charge to be deposited into the can which by this time has moved to a position to receive the charge.

Due to the fact that the axis of the star knife 39 is below the plane of the inlet opening of the measuring chamber the salt or other material in passing into the measuring chamber discharges thereinto above the hub of the star knife and due to this arrangement and the fact that the blades of the star knife can move closely adjacent the walls of the measuring chamber throughout their movement, there is no danger of the leakage of material past the star knife and thus affecting the quantity to be measured.

Furthermore it will be noted that due to the shape of the agitator wheel it sufficiently displaces the material in the container to prevent packing and to secure a flow of the salt. It also provides a support for the material and offers a minimum resistance to the material as the agitator rotates.

I claim as my invention:

1. A device for depositing granular material in moving containers comprising a hopper, a truncated cone shaped rotary agitator having its side walls concaved, mounted in the bottom of the hopper, the curve of the walls starting at the top of the cone and extending substantially to the periphery thereof, and a measuring device communicating with the hopper and adapted to measure and deliver the material delivered thereto by said agitator.

2. A device for depositing granular material in moving containers comprising a hopper, a rotary truncated cone shaped agitator in the bottom of the hopper and having its side walls concaved, the curve of the walls starting at the top of the cone and extending substantially to the periphery thereof, the periphery of said agitator having thereon a plurality of substantially vertically extended pusher vanes having their operating faces disposed at an angle to the circumferential movement of the agitator, and a measuring device communicating with the hopper adapted to receive and measure the material delivered from said hopper by said agitator.

3. A device for depositing granular material in moving containers comprising a hopper, a rotary agitator in the bottom of said hopper, a measuring chamber disposed laterally of the agitator on the hopper, there being a discharge opening on the hopper communicating with the chamber, a rotary star knife in said measuring chamber having its axis of rotation below the bottom of the discharge opening in the hopper, and means operated by the moving containers for operating said star knife.

4. A device for depositing granular material in moving containers comprising a hopper, a rotary agitator in the bottom of the hopper, a measuring chamber on one side of the hopper communicating with the hopper in the plane of the agitator, a star knife in the chamber, the walls of the chamber being arcuate for intimate juxtaposition to the knife throughout its rotation, and means for operating said star knife manipulated by the movement of the containers.

5. A device for depositing granular material in moving containers comprising a hopper, an agitator in the bottom of the hopper, a measuring chamber on one side of the hopper communicating with the hopper in the plane of the agitator, a star knife in the chamber rotating on an axis below the bottom of the communicating opening between the chamber and the hopper, the walls of said chamber surrounding said star knife being arcuate and being in intimate juxtaposition to the edges of the star knife blades throughout their rotary movement.

6. A device for depositing granular material in moving containers comprising a hopper, a rotary agitator in the bottom of the hopper comprising a substantially hollow truncated cone having its side walls concaved, the curve of the walls starting at the top of the cone and extending substantially to the periphery thereof, and spiral fins on the under face of said walls, and a measuring device communicating with the hopper and operatively connected with trip mechanism driven by the moving containers to dispense a predetermined quantity of material to the moving containers in sequence.

7. A device for depositing granular material in moving containers comprising a hopper having a heating chamber in the bottom and side walls thereof, a rotary agitator in the bottom of the hopper comprising a substantially hollow truncated cone shaped member having the side walls thereof concaved and provided at its outer periphery with pusher fins disposed at an angle to the circumferential movement of the agitator, said hopper having a discharge opening in the side wall thereof in the plane of the agitator, a measuring chamber for receiving the material discharged from said hopper, a star knife rotating in said measuring chamber, the axis of rotation of said knife being below the bottom of the delivery opening in the hopper and the walls of said measuring chamber being arcuate and in close juxtaposition to the edges of the knife blades throughout their rotated movement, said measuring chamber having a discharge opening in the bottom thereof, a chute receiving the measured material from said measuring chamber, and a closure for said chute, opened by the movement of the containers for delivery of the material from said chute into the containers.

8. A device for depositing granular material in moving containers comprising a hopper formed of a single casting having a heating chamber formed in the side walls thereof, a truncated cone-shaped rotary agitator having its side walls concaved from the top of the cone to substantially the periphery thereof, mounted in the bottom of the hopper, the heating chamber formed in the side walls of the hopper extending to a point above the top of the agitator, a trip wheel associated with said hopper and adapted to be actuated by the moving containers and a measuring device communicating with the hopper and arranged in juxtaposition to the heating chamber and operatively connected with the trip wheel to dispense a predetermined quantity of material to the moving containers.

9. A device for depositing granular material comprising a hopper formed of a single casting having a heating chamber in the bottom and side walls thereof, a truncated cone-shaped rotary agitator having its side walls concaved from the top of the cone to substantially the periphery thereof mounted in the bottom of said hopper, a trip wheel associated with said hopper and adapted to be actuated by the moving containers, and a measuring device communicating with said hopper mounted in juxtaposition to the heating chamber in the side walls of the hopper and operatively connected with the trip wheel to dispense a predetermined quantity of material to the moving containers in sequence.

10. A device for depositing granular material in moving containers comprising a hopper having a cone-shaped bottom concaved from the top of the cone substantially to the periphery thereof, a hollow substantially cone-shaped agitator fitting said bottom and having its side walls concaved from the top of the cone to substantially the periphery thereof, a measuring chamber disposed laterally of the agitator on the hopper, means operating in said measuring chamber for predetermining the quantity of material to be discharged therefrom and means operated by the movement of the containers for operating said measuring means.

DAMON MARCEL HUME.